United States Patent [19]
Jain et al.

[11] 3,969,590
[45] July 13, 1976

[54] SURFACE ACOUSTIC WAVE APPARATUS

[75] Inventors: Anant K. Jain, Richardson; Robert K. Marston, Plano, both of Tex.

[73] Assignee: Rockwell International Corporation, El Segundo, Calif.

[22] Filed: Apr. 4, 1975

[21] Appl. No.: 565,035

[52] U.S. Cl. ............................ 178/66 R; 325/163; 333/30 R
[51] Int. Cl.² .......................................... H04L 27/12
[58] Field of Search ...................... 178/66 R, 66 A; 325/163; 332/26; 333/30 R, 72; 331/154, 155, 165, 166

[56] References Cited
UNITED STATES PATENTS

| | | |
|---|---|---|
| 3,568,102 | 3/1971 | Tseng................................ 331/155 X |
| 3,633,132 | 1/1972 | Hartemann ........................ 333/30 R |
| 3,753,166 | 8/1973 | Worley et al. ........................... 333/72 |
| 3,800,247 | 3/1974 | Tancrell et al..................... 333/72 X |
| 3,869,682 | 3/1975 | Heeks et al........................ 332/26 X |

*Primary Examiner*—Benedict V. Safourek
*Attorney, Agent, or Firm*—Bruce C. Lutz; Robert J. Crawford

[57] ABSTRACT

A modulating system using a surface acoustic wave device for receiving impulses and providing, as an output, shaped carrier signals for transmitting data. The preferred embodiment uses impulses of positive and negative polarities to provide minimum shift keyed modulated output signals wherein the carrier frequency is an odd one-quarter multiple of the repetition rate of the impulses.

5 Claims, 3 Drawing Figures

SURFACE ACOUSTIC WAVE APPARATUS

THE INVENTION

The present invention is generally concerned with signal waveform modifying devices and more particularly is concerned with a surface acoustic wave device for providing MSK output signals in response to impulse signals indicative of data.

Surface acoustic wave devices are based upon a theoretical discovery by Lord Rayleigh in 1885 of electric surface waves and more recent discoveries that interdigital transducers attached to piezoelectric material can generate and detect electric fields associated with the Rayleigh waves in piezoelectric materials.

In the past, the primary use of surface acoustic wave devices (SAWD) has been in the use of filtering where an input signal is modified on a continuing basis to provide a frequency related output signal at a further transducer on the SAWD. There is a time delay between application of the signal to the input transducer and the receipt by the output transducer. Thus, the devices have also been used for time delay elements, as well as tapped delay lines (transversal filters).

The present inventive concept involves the use of a SAWD as a means of producing specific outputs in the form of a modulated signal. More specifically, we have ascertained that a SAWD can be used upon the application of an impulse thereto to produce minimum shift keyed modulated outputs without the use of auxiliary phase lock loops, AFC loops and/or oscillator, and/or balanced modulators, or other means as has been required in the past. As is known by those skilled in the art, once a SAWD is fabricated, no tuning or adjustments are ever required as has been the case in the prior art.

Frequency accuracy is determined by the SAWD transducer and the data clock source.

It is, therefore, an object of the present invention to provide an improved and simplified MSK generator.

Other objects and advantages of the present invention may be ascertained from a reading of the specification and appended claims in conjunction with the drawings wherein:

Figure 1:
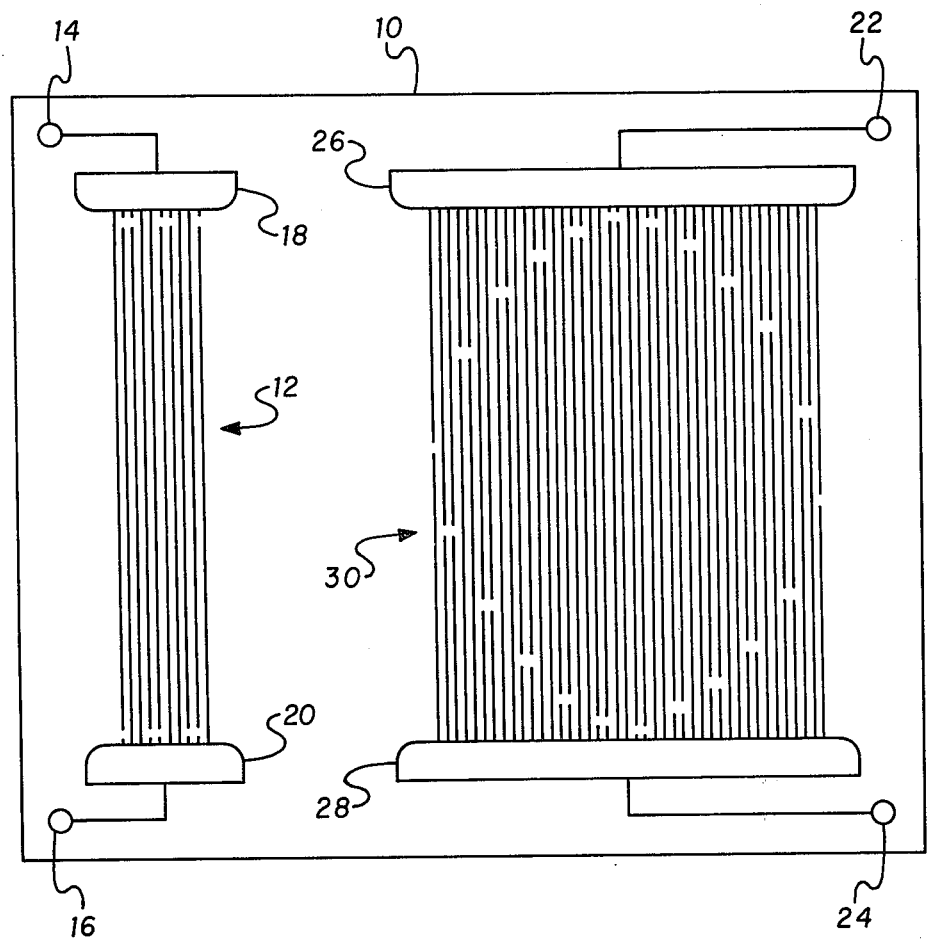
FIG. 1 is a pictorial drawing of a SAWD with the input and output interdigital transducers mounted thereon.

In FIG. 1, a block of surface acoustic wave material 10 has placed thereon a transducer generally indicated as 12 having two input terminals or impulse supplying means 14 and 16 connected to deposited bars 18 and 20, respectively. Projecting from the bar 18 are a plurality of fingers extending in a downwardly direction while bar 20 has a plurality of fingers extending in an upwardly direction. A further pair of output terminals or output signal supplying means 22 and 24 are illustrated at the other end of the SAWD 10 and these terminals are connected respectively to deposited areas 26 and 28.

Although the fingers of transducer 12 extend substantially the entire distance between bars 18 and 20, the fingers in a transducer 30 using the bars 26 and 28 are broken at intermediate points. An observation of these breaks will show that the breaks form the envelope of a cosine weighted wave. While the presently used and preferred embodiment of this invention uses split fingers or finger pairs in the transducer, to reduce distortion and higher order harmonics, many variations of transducers and configurations thereof have been used in the prior art. Examples of same may be found in IEEE articles in the Transactions on Microwave Theory and Techniques, April 1973. In particular, there is an article by Hartmann, et al. from pages 162–175 which shows other methods of generating a weighted response utilizing nonuniform electrode overlap.

Figure 2:
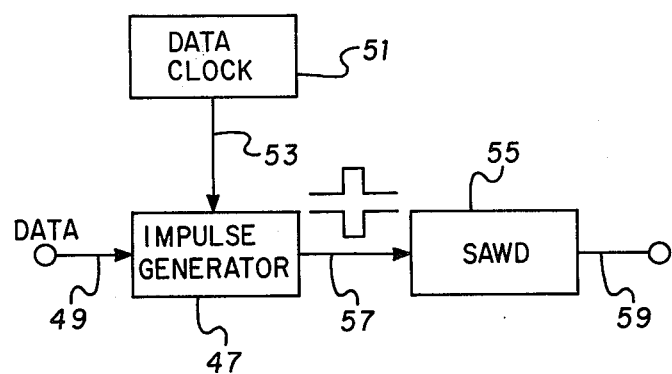
FIG. 2 is a block schematic diagram of the SAWD of FIG. 1 wherein impulses are applied thereto to provide a MSK output.

In FIG. 2, an impulse generator 47 is illustrated as accepting data on a line 49 and a clock signal from data clock 51 on a lead 53. The data clock 51 is providing signals on line 53 at the desired bit rate and the data is being applied on lead 49 in some manner corresponding to the bit rate. Output impulses are then supplied from the impulse generator to a surface acoustic wave device 55 on a lead 57. These impulses may be either positive or negative as shown in waveform 3C to produce an output as illustrated in waveform 3D on a lead 59.

Figure 3:
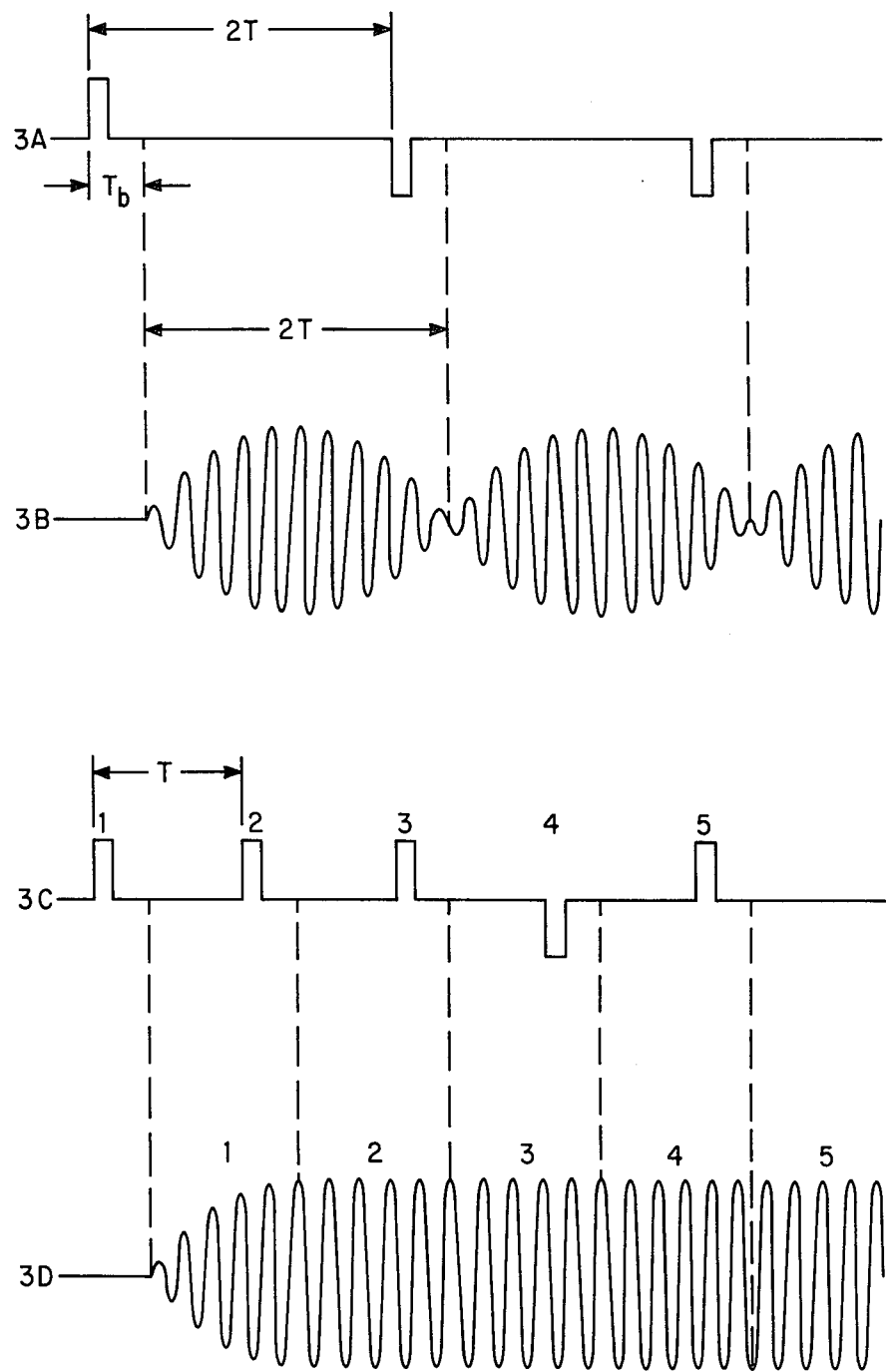
FIG. 3 is a collection of waveforms used in describing the operation of the SAWD.

The envelope joining the breaks in the fingers forms a cosine weighted wave, and thus the transducer provides as an output the waveform of FIG. 3B in response to an impulse as shown in FIG. 3A. The total span of the fingers in transducer 30 are twice the wave length of the frequency corresponding to the desired impulse bit rate to be used for the MSK modulation. FIG. 3A illustrates bits occurring at half the desired bit rate. The spacing between centers of adjacent split finger is equal to one-half the wave length of the desired carrier frequency. To provide proper operation, the ratio of the carrier frequency to the bit rate needs to be an odd quarter multiple, i.e., ¾, 5/4, 7/4, 9/4, 11/4 . . . . One embodiment of this invention is presently operating at 21/4 ratio. This embodiment uses a carrier frequency of 67.271232 megahertz while the bit rate or impulse rate is 12.813568 million pulses per second. While the output transducer has been shown as the transducer which is weighted, since terminals 14 and 16 were described as being the input signal supplying means, the transducers can be used interchangeably and the impulse can be applied to terminals 22 and 24 while the output signal may be retrieved from terminals 14 and 16. As illustrated, the width of the transducer 12 is much narrower than the total width of transducer 30. Thus, the characteristics of the SAWD are such that with this configuration of the transducers, the frequency response of transducer 12 is very broad around the carrier frequency. On the other hand, the frequency response of transducer 30 is fairly narrow. The inherent characteristics of a SAWD are such that the resultant output signal is dependent upon a product of the frequency response characteristics of the two transducers. Thus, with proper design both of the transducers 12 and 30 may be configured to be weighted for part of the weighted output signal rather than weighting only one of these transducers. However, the design is much more involved and will not be pursued as the particular design of the transducer is not part of the inventive concept.

As illustrated in FIG. 3A, pulses occur at a rate corresponding to twice the wavelength of an acoustic signal as it travels in the SAWD 10. It will be further noted that a given time delay $T_D$ (not to scale) is illustrated between the commencement of an impulse in waveform 3A and the appearance of an output in waveform 3B. The time delay $T_D$ is due to electrical length between the input and output transducers 12 and 30. Since the pulses of 3A are illustrated at half the design bit rate, an output is generated which is a complete output without interference from that caused by other impulses. The first response in waveform 3B is illustrative of a positive impulse while the last two waveforms are illustrative of negative impulses. It will be noted that each of these waveforms in FIG. 3B produce 10½ cycles from commencement to end of the oscillatory period and that the phase of the signal corresponds to the polarity of the impulse.

If the pulses of waveform 3A are increased in number to the desired bit rate as illustrated in FIG. 3C, the transducer 30 will begin to receive the effects of a second impulse (3C-2) before completing an output with respect to a first impulse (3C-1). Thus, the transducer 30 provides an output which is a composite of two impulses at any given time from time period 3D-2 and on. However, as is well known in MSK theory and as brought out in a U.S. Pat. No. 2,977,417 issued to M. L. Doelz, et al. and assigned to the assignee of the present invention, the combination of the odd quarter multiples of cosine weighted carrier signals will produce a composite waveform which between impulses is either one-quarter cycle greater or one-quarter cycle less than the SAWD carrier frequency in any given bit interval. As illustrated, there are five impulses in waveform 3C and each of them causes effects to appear at the output of transducer 30 a given time delay ($T_D$) later. The impulses of 3C are labeled 1 through 5 and for convenience the sections in waveform 3D corresponding to the commencement of each of these impulses are also labeled identically. Thus, section 1 of waveform 3D illustrates a buildup in response to impulse 1 of FIG. 3C as previously illustrated in FIG. 3B. Waveform 3D-2 illustrates the combined effects of the remaining portion of pulse 3C-1 and the commencement of pulse 3C-2. During section 2 of waveform 3D there are exactly five complete cycles. These are all the same amplitude due to the composite declining of the effects of an impulse 3C-1 and the rising effects of the more recent impulse 3C-2 as mathematically described below:

$$F(t) = \pm (\sin 2\pi f_c t)(\sin 2\pi R/4\ t) \pm (\cos 2\pi f_c t)(\cos 2\pi R/4\ t) = \pm \cos 2\pi (f_c \pm (R/4))t.$$

where:
 $F(t)$ = instantaneous amplitude
 $\pm$ = represents impulse polarity
 $f_c$ = carrier frequency
 $t$ = time
 $R$ = data rate During section 3 of waveform 3D, there is a further completion of five cycles of carrier frequency due to the combination of impulse response due to 3C-2 and 3C-3. In section 4, it will be noted there are five and one-half cycles of carrier frequency due to the combination of the response due the positive impulse 3C-3 and the response due to negative impulse 3C-4. The results of the fifth impulse have not been illustrated.

In view of the above information, it may be ascertained that the present inventive concept involves the use of weighting one or more transducers in a surface acoustic wave device wherein the application of an impulse to an input thereof will result at an output thereof a modulated signal which may be amplified and transmitted for use in transmitting data. In one embodiment, this device has been used for transmitting minimum shift keyed signals representing data in response to impulses applied thereto which also represent the data. A cosine function is an ideal modulating weighting function for MSK signal transmission but is not the only function available, as a cosine squared function or a gaussian function, any other suitable amplitude weighted function may be desired in some applications.

The present apparatus produces an output signal which is a composite signal the overall amplitude of which is dependent upon the sum of the impulse response from each of the individual impulses. Thus, each impulse produces a given amplitude weighted response the duration of which must be greater than T in order to provide a composite output waveform having an envelope which is substantially constant in amplitude. The duration of 2T theoretically provides a constant amplitude composite signal in the preferred embodiment. Apparatus using other weighted functions may have different impulse response durations.

We therefore wish to be limited not to the specific device shown but only to the broader idea of utilizing a surface acoustic wave device in combination with a plurality of transducers wherein a given impulse will provide an output signal suitable for amplification and transmission and indicative of modulation of data represented by the impulse as claimed infra.

We claim:
1. Minimum shift keyed modulating apparatus comprising, in combination:
 piezoelectric substrate means;
 input impulse signal supplying means for supplying unmodulated input impulses having a period T therebetween;
 input transducer means mounted on said substrate means and connected to said input signal supplying means;
 output transducer means, for providing an output constant frequency carrier signal having an amplitude weighted envelope in an oscillatory period having a duration greater than T for each inpulse applied to said input transducer means, mounted on said substrate means; and
 output signal means electrically connected to said output transducer means for providing MSK output signals.

2. Apparatus as claimed in claim 1 wherein:
 the ratio of the oscillation frequency of said carrier signal to the frequency of said input impulses is an odd one-fourth multiple.

3. Apparatus as claimed in claim 1 wherein:
 said output transducer means is cosine weighted; and
 the transducer means has fingers wherein the distance between fingers on said transducer means is one-half the carrier wavelength.

4. Filter apparatus for passing selected frequency components of an incoming impulse signal recurring at a rate of 1/T to provide a shaped train of carrier output pulses occurring at a predetermined constant frequency $f_c$ comprising, in combination:
 surface acoustic wave substrate means;
 input and output transducer means mounted on said substrate means, at least one of said transducer means having an amplitude weighted configuration;

means for supplying an impulse signal to said input transducer means; and output means for retrieving an output signal having a weighted oscillator response duration of greater than T for each impulse supplied to said input transducer means.

5. Apparatus as claimed in claim 4 wherein:

said transducer means comprise pairs of interleaved fingers wherein the finger spacing is related to $f_c$ by the formula $$D = k/2f_c$$

wherein:
- $D$ = distance between centers of interleaved fingers,
- $k$ = velocity of propagation of surface acoustic wave substrate, and
- $1/f_c$ = wavelength of carrier frequency in substrate means being used.

* * * * *